(12) United States Patent
Vaeth

(10) Patent No.: US 8,549,602 B2
(45) Date of Patent: Oct. 1, 2013

(54) SYSTEM AND METHOD FOR HANDLING PERMITS FOR USER AUTHENTICATION TOKENS

(75) Inventor: J. Stuart Vaeth, Winchester, MA (US)

(73) Assignee: Diversinet Corp., Toronto (CA)

( * ) Notice: Subject to any disclaimer, the term of this patent is extended or adjusted under 35 U.S.C. 154(b) by 655 days.

(21) Appl. No.: 11/779,795

(22) Filed: Jul. 18, 2007

(65) Prior Publication Data

US 2008/0127321 A1 May 29, 2008

(30) Foreign Application Priority Data

Nov. 29, 2006 (CA) .................................... 2569355

(51) Int. Cl.
*H04L 9/32* (2006.01)
(52) U.S. Cl.
USPC ................ 726/9; 713/156; 713/176; 713/185
(58) Field of Classification Search
USPC ............................................................ 726/9
See application file for complete search history.

(56) References Cited

U.S. PATENT DOCUMENTS

| | | | | |
|---|---|---|---|---|
| 5,412,717 A | * | 5/1995 | Fischer | 713/156 |
| 5,615,268 A | * | 3/1997 | Bisbee et al. | 713/176 |
| 5,960,085 A | * | 9/1999 | de la Huerga | 340/5.61 |
| 5,978,484 A | * | 11/1999 | Apperson et al. | 705/54 |
| 6,003,014 A | * | 12/1999 | Lee et al. | 705/13 |
| 6,216,116 B1 | * | 4/2001 | Barkan et al. | 705/76 |
| 7,710,933 B1 | * | 5/2010 | Sundaralingam et al. | 370/338 |
| 7,779,482 B1 | * | 8/2010 | Yen et al. | 726/30 |
| 7,934,005 B2 | * | 4/2011 | Fascenda | 709/229 |
| 2003/0182573 A1 | * | 9/2003 | Toneguzzo et al. | 713/201 |
| 2005/0005133 A1 | * | 1/2005 | Xia et al. | 713/185 |
| 2005/0091483 A1 | * | 4/2005 | Fascenda | 713/153 |
| 2007/0051795 A1 | * | 3/2007 | Shipman | 235/379 |
| 2007/0101152 A1 | * | 5/2007 | Mercredi et al. | 713/185 |
| 2007/0208928 A1 | * | 9/2007 | Rios et al. | 713/1 |
| 2007/0249323 A1 | * | 10/2007 | Lee et al. | 455/411 |
| 2009/0251724 A1 | * | 10/2009 | Nakajima | 358/1.15 |

\* cited by examiner

*Primary Examiner* — Kambiz Zand
*Assistant Examiner* — Yonas Bayou
(74) *Attorney, Agent, or Firm* — McMillan LLP

(57) ABSTRACT

The invention consists of a method of handling permits, comprising the steps of: (a) providing a user with a user permit linked to a user authentication token, the user permit defining permissions granted to the user and the user token containing identity authentication information for the user; (b) presenting the user token to a gatekeeper to confirm the user's identity; (c) validating the user permit based on the permit issuer's digital signature; and, (d) granting the user access based on said permissions within the user permit.

11 Claims, 3 Drawing Sheets

SYSTEM AND METHOD FOR HANDLING PERMITS FOR USER AUTHENTICATION TOKENS

FIELD OF THE INVENTION

The present invention relates to the field of digital security using certificates and tokens. In particular, it relates to a system and method for handling digital permits associated with user authentication tokens.

BACKGROUND OF THE INVENTION

One of the difficulties in dealing with current electronic transactions is ensuring proper security measures are in place to identify the user and the service being used. Most systems rely on user tokens, which contain secure information that is used to validate the identity of the user, preferably through some form of two-factor authentication, such as a One Time Password (OTP) or challenge-response algorithm. User permits, containing digital signatures, identify the user's access and authorizations for services (permissions). Permit issuers' certificates serve to validate the permissions.

Current solutions based on digitally signed permits, such as that disclosed in U.S. Pat. No. 6,216,116 and as used with CCITT X.509 Attribute Certificates rely on a user level digital certificate infrastructure to be in place to support the user identification and authentication process connected with permit verification. Issuance and management of a user PKI (Public Key Infrastructure) is costly and complex and, as a consequence, is not widely deployed today. The result is that digital permits become difficult to deploy.

An alternative solution to the existing user certificate and digital permit system is desirable to promote larger deployment of secure verification systems. Ideally, any such solution should combine the security and validation provided by user authentication tokens and user permits.

It is an object of this invention to provide such a solution.

SUMMARY OF THE INVENTION

The invention consists of a method of handling permits, comprising the steps of: (a) providing a user with a user permit linked to a user token, the user permit defining permissions granted to the user and the user token containing identity authentication information for the user; (b) presenting the user token to a gatekeeper to confirm the user's identity; (c) validating the user permit based on the permit issuer's digital signature and (d) granting the user access based on said permissions within the user permit.

Optionally, the user authentication token is either a hardware token or a software token.

Another aspect of the invention is a system for handling permits, comprising: (a) a token granting authority, which provides users with user tokens containing identity authentication information for each user; and (b) a permit granting authority, which provides users with user permits containing permissions granted to each user and binds each of the user permits to one of the user tokens.

Preferably, the permit granting authority has an existing relationship with the token granting authority such that the permit granting authority can efficiently validate the user token when issuing permits for that user. Preferably, the user token identifier contained in the user permit is a globally unique identifier, such that the permit can be validated in an open network outside of the domain in which the token was issued, enabling global interoperability.

According to still another aspect of the invention, there is provided a method of generating user permits for a user, comprising: (a) authenticating the user's identity via a user token held by the user; and (b) generating a user permit for the user which is linked to the user token.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

The inventive system and method presented herein consists of handling permits in which the user identity in the permit is bound to a user authentication token rather than to a PKI certificate.

There is a need to provide a system and method which overcomes at least one of the limitations in the existing user PKI certificate security models. The inventive system and method present herein is intended to fulfill this need.

Figure 1:
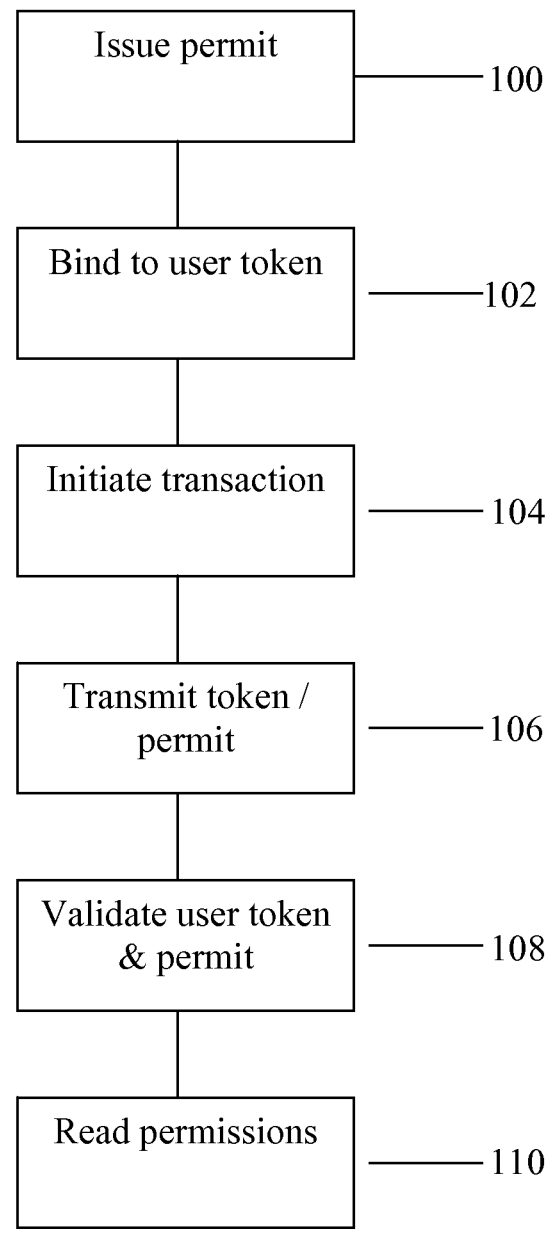
FIG. 1 is a flow chart outlining a preferred method of the present invention.

A presently preferred embodiment of the method is shown in FIG. 1. The user is issued a user permit (100) which contains an identifier for the user authentication token, along with a list of permissions associated with the user token, thus binding the user permit to the user token (102). A typical user token uses a secure authentication method, such as a One-Time Password (OTP). When the user initiates a transaction (104) requiring the user permit, the user permit is transmitted (106) along with the user token authentication data (e.g. an OTP value). In use, the user token is validated (e.g. OTP validation) to verify the user's identity (108) and then the user permit is validated and the transaction is accepted or rejected based on the permissions in the permit (110). Preferably, the user tokens and the user permits are validated within the same administrative domain, to optimize the process by which the permit validator can locate and verify the user token in real-time. Otherwise, the permit validator may locate the user's token validation service via a lookup service based on the token identifier, and route the token validation request to that token validation service, as part of the permit validation process.

The user token associated with the user permit must be unique within the domain where the user permits are used. It could be either a vendor-proprietary token, or utilize a globally unique token identifier such as of the type being proposed by the OATH Consortium (Initiative for Open Authentication, www.openauthentication.org).

Leveraging an existing two-factor authentication system for verification is simpler than authenticating a user certificate when the user permit is bound to that certificate. The permit validation system, rather than verifying user certificates and associated revocation lists, performs a real-time token validation step and then verifies that the associated user permit is digitally signed by the permit issuer. As a result, only a very minimal PKI is required to support a small number of permit issuer certificates, dependent only on the number of permit issuers in the system, not the number of users who are issued permits.

Figure 2:
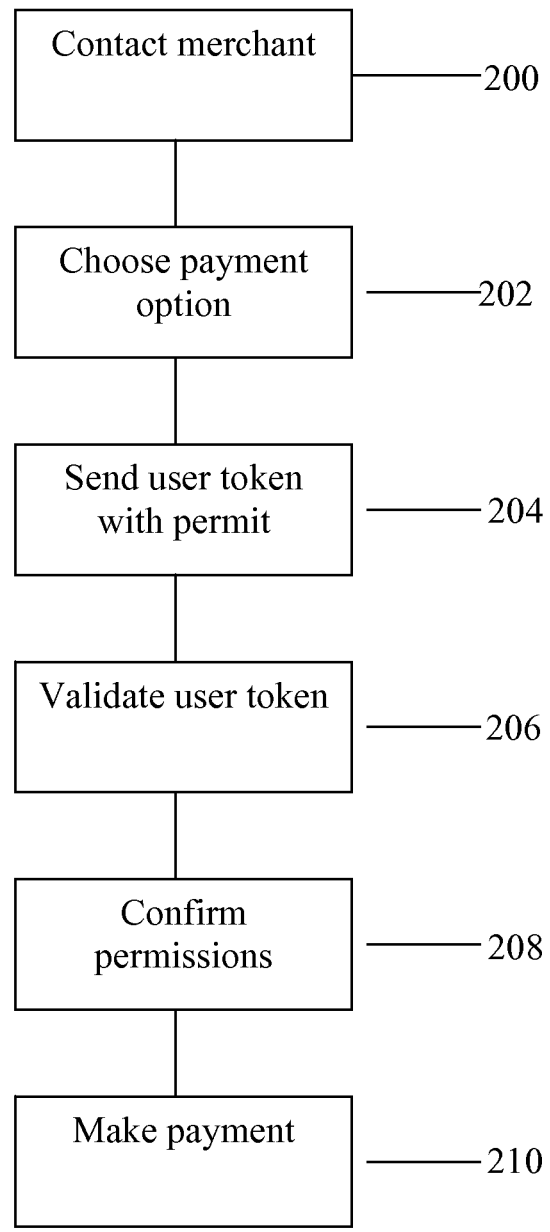
FIG. 2 is a flow chart of a process for merchant payments using an embodiment of the present invention.

One application for this system is for mobile payments, as shown in FIG. 2. A user contacts an online merchant (200) and selects a product or service to purchase. The user elects to make a secure credit card payment from his mobile phone (202), submitting (204) an OTP generated by the phone (user token) and a digital permit bound to his user token (user permit) indicating card payment limits for mobile phone transactions, as defined by the credit card issuer. The payment server (i.e. merchant) verifies the user's identity by OTP validation of the user token (206) and confirms the requested purchase is permitted by verifying the user permit (208). The transaction is then concluded by execution of the payment (210). Thus, the merchant's payment server can rely on the user permits to make payment decisions, and does not need to access the credit card issuer's database to determine payment limits for this user. A similar system can be implemented to use debit accounts or other financial accounts in a similar manner.

Figure 3:
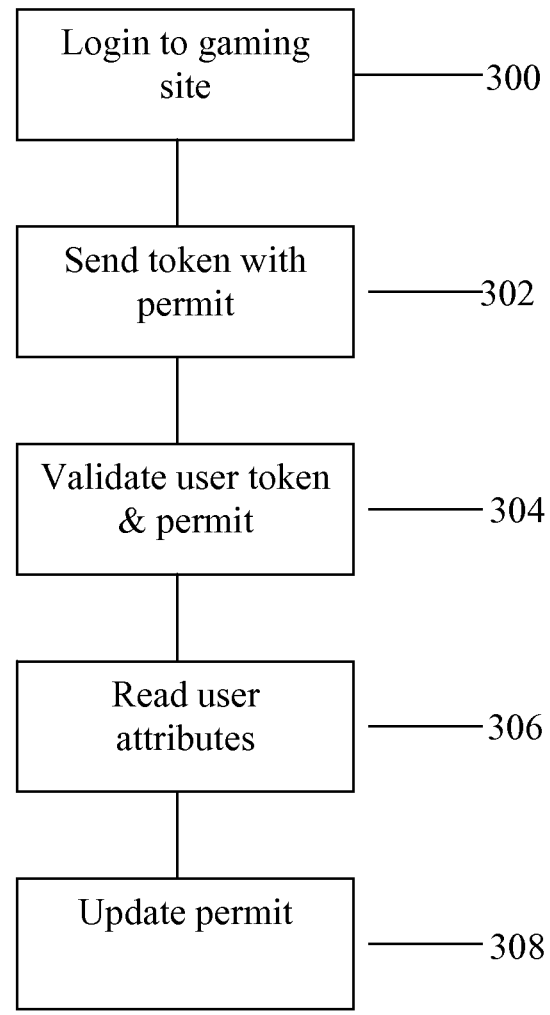
FIG. 3 is a flow chart of a process for online gaming registration using an embodiment of the present invention.

Another application is in the online gaming industry, as shown in FIG. 3. When a user logs into a gaming site (300), typically from his PC, a user token with an associated user permit is sent (302) as part of the login process to determine the user's identity. The user token provides security in the form of two-factor authentication, such as OTP, and is used to verify the user's identity (304). The user permit contains the attributes the user has gained over time in the online game and is read to determine the user's status and permission within the game server (306). The user permit is then updated and reissued (308) dynamically by the gaming authority to reflect changes in the user's game status over time (experience, achievements, awards, etc.) without making any changes to the user token. The gaming server is able to verify the user's identity (through the user token) and access level/game player privileges (through the user permit) without the need to access any other servers to confirm or collect information. Use of the system provides flexibility to the user, who is capable of submitting his permit to multiple gaming servers who are independent of the gaming authority that issues and updates the permit, thus allowing the user to transport his gaming credentials across different gaming services.

The two above-mentioned applications can be combined, for example, on an online gambling site, the user permit can include not only the user's credentials and history for accessing the site, but also financial information enabling the user to make transfers to and from his bank account (or credit card, etc.) to an account on the site.

The user tokens can take various forms, including physical tokens such as fobs, scratch cards, USB keys, flash memory or SIM cards, and software tokens deployed on smart devices such as mobile phones, PDAs and PCs.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A method of handling permits, comprising the steps of:
   (a) providing a user with a user permit linked to a user authentication token, said user permit defining permissions granted to said user and said user token containing identity authentication information for said user;
   (b) generating user token authentication data using said user authentication token;
   (c) simultaneously presenting said user permit and said user token authentication data to a gatekeeper to confirm said user's identity;
   (d) verifying the user's identity via said user permit and said user token authentication data;
   (e) validating the user permit based on the permit issuer's digital signature; and,
   (f) granting said user access based on said permissions within said user permit.

2. The method of claim 1, wherein said user authentication token is a hardware token.

3. The method of claim 1, wherein said user authentication token is a software token.

4. The method of claim 1, wherein said user token authentication data comprises a one-time password.

5. A system for handling permits, comprising:
   (a) a token granting authority, which provides users with user tokens containing identity authentication information for each user, said user tokens generating user token authentication data for authenticating said users;
   (b) a permit granting authority, which provides users with user permits containing permissions granted to each user and binds each of said user permits to one of said user tokens
   (c) a mobile device configured to generate user token authentication data using one of said user tokens, and present said user token authentication data and one of said user permits to a gatekeeper, said user token authentication data authenticating the user of said mobile device.

6. The system of claim 5, wherein said permit granting authority has an existing relationship with said token granting authority such that the permit granting authority can efficiently validate the user token when issuing permits for that user.

7. The system of claim 5, wherein the user token identifier contained in the user permit is a globally unique identifier, such that the permit can be validated in an open network outside of a domain in which the token was issued.

8. The system of claim 5, wherein said user token authentication data comprises a one-time password.

9. A method of generating user permits for a user, comprising the steps of:
   (a) authenticating said user's identity via user token authentication data generated using a user authentication token held by said user; and
   (b) generating a user permit for said user which is linked to said user authentication token, such that said user permit and said user token authentication data can be presented simultaneously to authenticate said user.

10. The method of claim 9, wherein said user permit may be generated by the same entity which granted said user authentication token.

11. The method of claim 9, wherein said user token authentication data comprises a one-time password.

* * * * *